Nov. 1, 1932.  A. M. HOUSER ET AL  1,885,202
LUBRICATED PLUG COCK
Filed Jan. 30, 1931    2 Sheets-Sheet 2
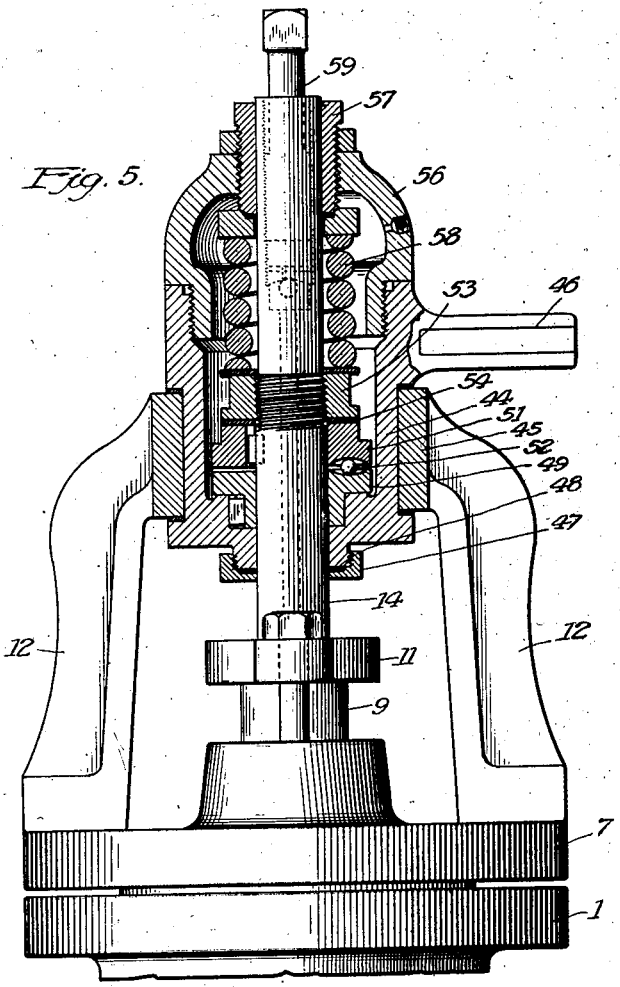
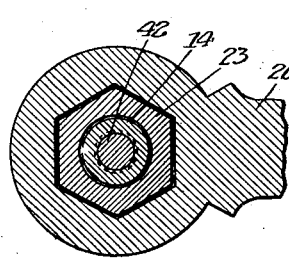
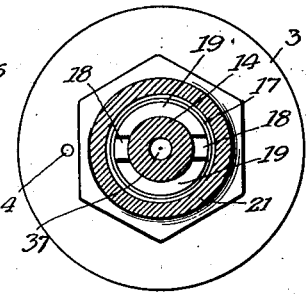
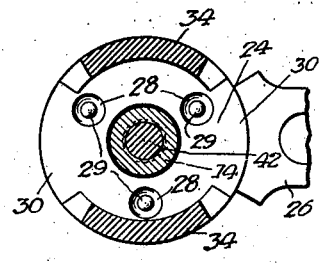
Inventors:
Arthur M. Houser and
Richard Fennema
By Wilson, Dowell, McCanna & Pelun
Attys Patented Nov. 1, 1932

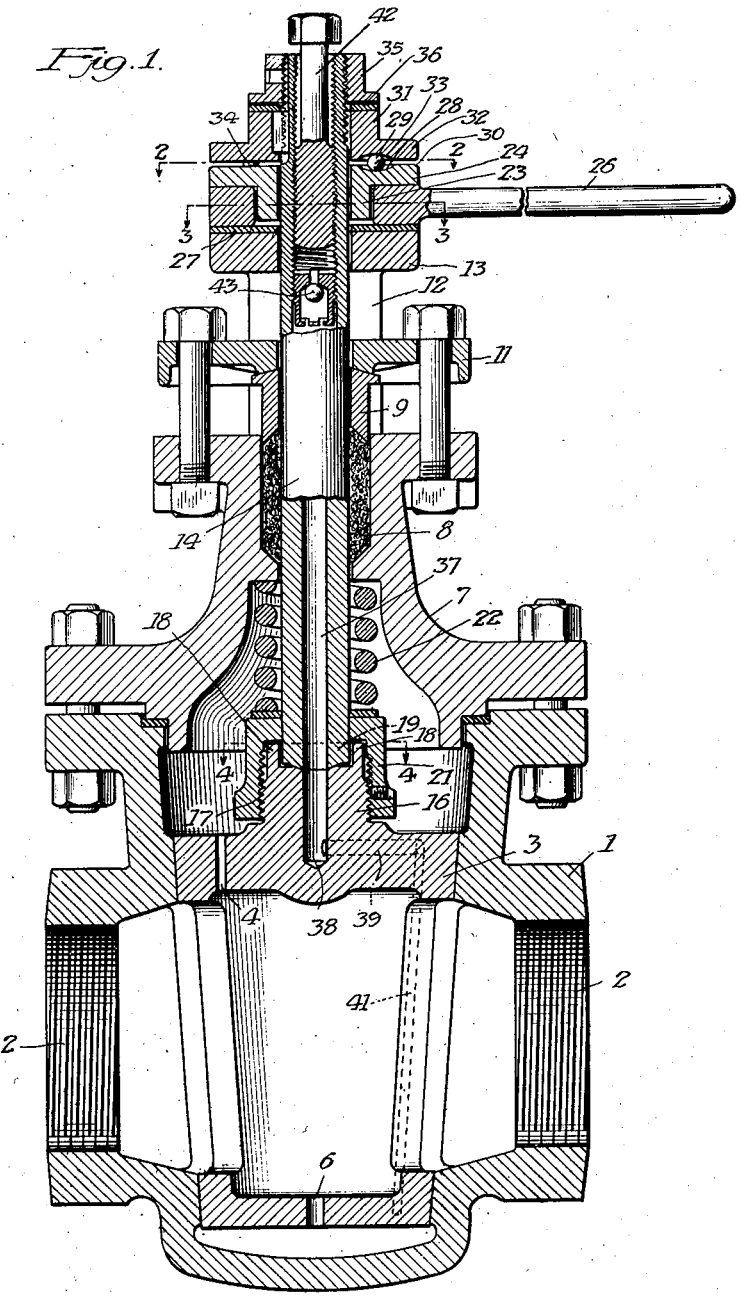

1,885,202

UNITED STATES PATENT OFFICE

ARTHUR M. HOUSER, OF OAK PARK, AND RICHARD FENNEMA, OF CHICAGO, ILLINOIS, ASSIGNORS TO CRANE CO., OF CHICAGO, ILLINOIS, A CORPORATION OF ILLINOIS

LUBRICATED PLUG COCK

Application filed January 30, 1931. Serial No. 512,234.

This invention relates to plug cocks and more particularly to that form of plug cock which is adapted to be easily operated under all conditions.

It is the purpose of this invention to provide a plug cock which may be positively operated with a definite invariable amount of effort independent of temperature, pressure, climatic and operating conditions.

It is a further purpose of this invention to provide such a cock which is particularly well adapted to be operated manually through the medium of a short lever or power operated by means of any suitable motor and is also particularly suitable for large sizes, capable of continuous satisfactory operation under high pressures and temperatures.

In accordance with this invention, a balanced plug is preferably although not necessarily used and means are provided for positively lubricating the contacting surfaces of the plug and for moving the plug a predetermined or limited axial distance to positively free the plug from its seat, the latter two means being independent of each other but operative in combination with each other to produce a uniformly easy operable cock under all conditions of use.

Preferably the plug raising means comprises one or more balls which are caused to travel up an inclined surface, the balls and inclined surfaces preferably being disposed out of possible contact with line fluids or gases. The positive lubricating means comprises a pressure lubricating device for forcing lubricant under pressure to the bearing surfaces of the cock. A casing may be provided for inclosing the essential operating mechanisms to protect them from climatic and service conditions.

Other novel features of construction and their resulting advantageous functions will be apparent from the following description given in connection with the drawings, in which:

Fig. 1 is a vertical section through approximately the center of the cock embodying the principles of this invention illustrating the cock in open position.

Fig. 2 is a horizontal section on line 2—2 of Fig. 1.

Fig. 3 is a horizontal section on line 3—3 of Fig. 1.

Fig. 4 is a horizontal section on line 4—4 of Fig. 1, and

Fig. 5 is a vertical section through the upper portion of the modified form of cock.

As can be seen from the drawings, the cock comprises generally a body 1 having a transverse passage 2 therethrough and a tapered plug 3 seated therein for selectively closing the passage through the body. In the illustrated form the cock is of the balanced type and the plug is therefore provided with a bleed 4 through the upper wall of the plug and a bleed 6 through the lower wall. To the upper portion of the body is secured a bonnet 7 which is counterbored to provide a stuffing or packing box 8 within which packing may be compressed by a gland 9 and a packing flange 11 all in the usual manner. The bonnet 7 is also provided with a pair of diametrically opposite yoke arms 12 which terminate at their upper end in a bearing collar 13.

To the upper end of the plug is secured a plug stem 14 which projects upwardly through the collar 13. In order to removably secure the lower end of the stem to the upper end of the plug the upper end of the latter is provided with a central boss 16 threaded externally as at 17. The upper end of this boss is bored to provide a socket to receive the lower end of the stem, the annular wall defining the socket being cut-away to provide two diametrically opposite lugs 18 adapted to interlock with the stem as will be hereinafter described. The lower end of the stem is provided with a pair of laterally projecting arcuate diametrically opposite lugs 19 arranged to fit within the recess formed in the upper end of the boss 16 between the lugs 18. A securing nut 21 having an aperture through its end wall of sufficient diameter to permit the passage of the stem but not lugs 19 threadedly engages the boss and retains the lugs 18 and 19 in interlocking relation. The contacting surfaces of the lower end of the stem and of the upper end of the plug are preferably ground to provide a ground seat connection therebetween to prevent the leakage of lubricant as will hereafter be pointed out. A compression spring 22 surrounding the lower end of the stem between the interior surface of the end wall of the stuffing box and the upper end surface of the locking nut returns the plug to its seated position when it has been lifted in the manner hereinafter described.

Surrounding the upper portion of the stem just above collar 13 of the yoke is a collar or lower ball race 23 having a flanged rim 24 upon one end, the collar being arranged with its flanged rim uppermost to provide an annular space between the flanged rim and the collar 13. The lower portion of the collar 23 is in the form of a hexagon nut as shown more particularly in Fig. 3 and is engaged by a wrench or handle 26 whereby the lower ball race may be rotated about the stem. A thrust washer 27 is placed between the lower surface of the handle and the upper surface of collar 13 to take up wear. The upper surface of the rim 24 is provided with three circular concave ball race depressions 28 which provide inclined surfaces to receive balls 29. The flanged rim 24 is cut away at diametrically opposite portions to provide a pair of diametrically opposite lugs 30 projecting outwardly from the flanged surface for reasons which will hereafter appear.

Directly over lower ball race 23 is an upper collar or race 31 having a lower flanged rim 32 disposed opposite the flanged rim 24 of collar 23. Race 31 is keyed to stem 14 for rotation therewith and axial movements thereon. Rim 32 is also provided upon its under-surface with three circular concave depressions 33 identical to depressions 28 in both size and position being directly above depressions 28 whereby balls 29 are received between the two depressions. The lower surface of rim 32 is provided with a pair of spaced lugs 34 projecting downwardly therefrom to extend between lugs 30 of the lower race (Fig. 2) with sufficient clearance therebetween to permit of partial rotation of handle 26 and lower race 23 without rotating upper race 31. The upper race is held down in predetermined position with respect to the lower race by means of an adjusting nut 35 threaded to the upper end of stem 14, a thrust washer 36 being disposed therebetween.

In order to properly and thoroughly lubricate the contacting surfaces of the plug and body the stem is bored as at 37 to provide a lubricant duct the bore connecting with a short vertical duct 38 in the upper end of the plug, this latter bore connecting with a lateral bore 39 which in turn connects with a groove 41 extending longitudinally down the side of the tapered plug, stopping short of the bottom thereof. Leakage between the end of the stem and the plug is prevented by the ground joint previously described. Any desired number of connecting bores 39 and longitudinal grooves 41 may be employed. The upper end of the bore 37 is enlarged and threaded to receive a cap screw 42 which serves as a compressor to force a lubricant such as grease under pressure into the foregoing ducts and grooves. If it is desired a removable check valve unit 43 may be placed in the lower end of the enlarged bore to prevent the lubricant within the lubricating grooves from working back up into the enlarged channel. This will also tend to prevent the compressing screw 42 from backing up.

From the foregoing description it will be apparent that upon rotation of handle or wrench 26 balls 28 will first be moved along the inclined surfaces 28 and 33 and thereby raise stem 14 and plug 3 a slight distance in accordance with the adjustment of the upper race. The inclined surfaces are so designed and the adjustment of nut 35 is so made that preferably a lift of only a few hundredths of an inch is given to the plug. After the plug has been raised sufficiently to break the joint or after lugs 30 engage lugs 34, the stem will be positively rotated upon further rotation of handle 26. From this it will be seen that a positive lift is given to the plug through positive mechanical means, the lift being in the nature of a positive mechanical cam which is variable by adjustment but constant after adjustment has been made. The contacting surfaces are also positively lubricated by a pressure means.

In Fig. 5 a modified form of the same invention is illustrated. In this form the spring for returning the plug to a seated position as previously described is removed to a location where it will not be in contact with the fluids or vapors therefrom of the material being handled. The spring and lifting mechanism are also made a part of a unit rotatable with the stem and are all encased by means of a cover. In this form only the upper part of the cock is illustrated in that the body plug and bonnet are similar to that previously described and are generally of standard construction.

In this form a sleeve 44 is provided which serves as an operating medium and as a carrier for the valve lifting and returning mechanism. The sleeve has an operating handle 46 projecting therefrom and is journalled for rotative movements but not axial movements within the upper collar 45 of yoke arms 12. The sleeve is cup shaped and is provided with an opening through the bottom thereof to permit the passage of stem 14 the opening being provided with a cap 47 and a closing or sealing washer 48. Seated in the bottom of the sleeve and keyed thereto for rotary movement therewith is a lower collar or ball race 49 similar to the lower ball race 23.

Disposed above this ball race and keyed to the stem for rotary movements therewith and axial movements thereon is an upper ball race 51. These races are provided with depressions having inclined surfaces similar to those previously described and between which are seated balls 52. Races 49 and 51 are provided with interlocking lugs (not shown) similar to lugs 30 and 34. The races are maintained in predetermined relation with respect to each other by means of an adjusting nut 53 threaded to the stem, a thrust washer 54 being inserted between the nut and the upper race.

It follows from the above that upon rotation of handle 46, sleeve 44 will be rotated turning lower race 49 therewith. The rotation of race 49 will cause the balls 52 to pass up the inclined surfaces and in the manner of a lifting cam raise stem 14 and the plug thereon as previously described after which race 51 will be rotated which in turn will rotate stem 14 and the plug thereon.

The upper end of the sleeve is inclosed by a cap 56 threaded thereto, the latter having an opening through its upper end which is provided with a bushing 57 which in turn serves as an adjusting screw for varying the compression of spring 58 and incidentally as a bearing for the upper end of stem 14. The compression spring is disposed within the cap between the inner end of bushing 57 and the upper end of nut 53 to return the plug to its seat and incidentally to maintain the stem and plug in seating position.

In this construction, the spring and ball races turn with the sleeve and stem and the spring therefore does not offer the frictional resistance to the turning of the plug after the latter has been lifted due to its rotating as a part of the entire unit enclosed by the sleeve 44 and cover 56, i. e., with the stem and plug.

As in the previously described form of this invention, the stem is bored to provide a lubricating duct leading to suitable channels in the plug and a compression screw 59 serves to place the lubricant under pressure.

From the foregoing description it can be seen that there has been provided a cock having positive mechanical means for raising the plug to thereby eliminate variable friction and having pressure lubricated contacting surfaces. The cock can therefore be operated with a constant relatively small effort and is maintained tight at high pressure and temperature conditions. The cock is also particularly well adapted for large sizes and for power operation. In the modification last described, the lifting mechanism and spring are so located that line fluids or gases cannot come into contact with the same.

It is obvious that various changes may be made to the details of construction without departing from the spirit and scope of this invention as defined in the appended claims.

We claim:

1. In a plug cock, a body having a transverse passage therethrough, a tapered plug seated in said body for closing said passage, one end of said plug terminating in interlocking members and a hollow plug stem providing a lubricant duct and having interlocking members upon one end adapted to removably engage the locking members on said plug and means for maintaining said locking members engaged to provide a leak proof connection between said stem and plug, said stem having means at its other end for engagement with a handle for rotating said stem and plug.

2. In a plug cock, a body having a transverse passage therethrough, a tapered plug seated in said body for closing said passage, means for forcing lubricant under pressure between the contacting surfaces of said plug and body, a bonnet having a bearing in its upper end secured to said body, a plug stem secured at one end to said plug and extending through said bearing, a flanged ball race rotatably mounted on said stem, a handle disposed between the flange of said race and the upper surface of said bearing for rotating said race and preventing axial movement thereof in one direction along said stem, a ball race secured to said stem, one of said ball races having an inclined surface and a ball seated between said races.

3. In a plug cock, a body having a transverse passage therethrough, a tapered plug seated in said body for closing said passage, means for forcing lubricant under pressure between the contacting surfaces of said plug and body, a bonnet having a bearing in its upper end secured to said body, a plug stem secured at one end to said plug and extending through said bearing, a flanged ball race rotatably mounted on said stem, a handle disposed between the flange of said race and the upper surface of said bearing for rotating said race and preventing axial movement thereof in one direction along said stem, a ball race secured to said stem, said ball races having a plurality of opposed depressions formed therein with inclined side walls and balls seated between said depressions.

4. In a plug cock, a body having a transverse passage therethrough, a tapered plug seated in said body for closing said passage, a stem secured at one end to said plug, means for forcing lubricant under pressure between the contacting surfaces of said plug and body, a bonnet terminating in a collar at its upper end secured to said body, a sleeve disposed within said collar for rotative movements but restricted against axial movements a ball race secured to said sleeve, a ball race secured to said stem, one of said races having an inclined surface formed therein, a ball disposed between said races and means for rotating said sleeve.

5. In a plug cock, a body having a transverse passage therethrough, a tapered plug seated in said body for closing said passage, a bonnet terminating in a collar at its upper end secured to said body, a sleeve disposed within said collar for rotative movements but restricted against axial movements, a ball race secured to said sleeve, a ball race secured to said stem, one of said races having an inclined surface formed therein, a ball disposed between said races and means for rotating said sleeve.

6. In a plug cock, a body having a transverse passage therethrough, a tapered plug seated in said body for closing said passage, a bonnet terminating in a collar at its upper end secured to said body, a sleeve disposed within said collar for rotative movements but restricted against axial movements, a ball race secured to said sleeve, a ball race secured to said stem, both of said races having inclined surfaces formed therein, balls disposed between said races and means for rotating said sleeve.

7. In a plug cock, a body having a transverse passage therethrough, a tapered plug seated in said body for closing said passage, a bonnet terminating in a collar at its upper end secured to said body, a sleeve disposed within said collar for rotative movements but restricted against axial movements, a ball race secured to said sleeve, a ball race secured to said stem, both of said races having inclined surfaces formed therein, balls disposed between said races, a spring within said sleeve arranged to urge said plug in seating position, means for rotating said sleeve, and a cap secured to the upper end of said sleeve inclosing said ball races and said spring.

8. In a plug cock, a body having a transverse passage therethrough, a tapered plug seated in said body for closing said passage, a stem secured at one end to said plug, means for forcing lubricant under pressure between the contacting surfaces of said plug and body, a bonnet yoke terminating in a collar at its upper end secured to said body, a sleeve disposed within said bonnet yoke collar for rotative movements but restricted against axial movements, a ball race secured to said sleeve, a ball race secured to said stem, said races having inclined surfaces formed therein, balls disposed between said races, means for rotating said sleeve and a cap secured to the upper end of said sleeve inclosing said ball races, said cap having a bearing in its upper end engaging the upper end of said stem.

9. In a plug cock, a body having a transverse passage therethrough, a tapered plug seated in said body and closing said passage, means for forcing lubricant under pressure between the contacting surfaces of said plug and body, a bonnet having a bearing in its upper end secured to said body, a plug stem secured at one end to said plug and extending through said bearing, a flanged collar rotatably mounted on said stem, a handle disposed between the flange of said collar and the upper surface of said bearing for rotating said collar and preventing axial movement thereof in one direction along said stem, a collar secured to said stem, one of said collars at least having an inclined surface operatively associated with the other of said collars whereby relative rotation between said collars will cause axial movement of said plug.

In witness of the foregoing we affix our signatures.

ARTHUR M. HOUSER.
RICHARD FENNEMA.